(12) United States Patent
Terrazas et al.

(10) Patent No.: US 7,776,983 B2
(45) Date of Patent: Aug. 17, 2010

(54) FLUOROCHEMICAL POLYMERIC SURFACTANTS

(75) Inventors: Michael S. Terrazas, Prescott, WI (US); George G. I. Moore, Afton, MN (US); Michael J. Sierakowski, Stillwater, MN (US); Rudolf J. Dams, Antwerp (BE)

(73) Assignee: 3M Innovative Properties Company, St. Paul, MN (US)

( * ) Notice: Subject to any disclaimer, the term of this patent is extended or adjusted under 35 U.S.C. 154(b) by 293 days.

(21) Appl. No.: 11/026,706

(22) Filed: Dec. 30, 2004

(65) Prior Publication Data

US 2006/0149012 A1 Jul. 6, 2006

(51) Int. Cl.
*C08F 12/30* (2006.01)
(52) U.S. Cl. .......................... 526/288; 564/86
(58) Field of Classification Search ................ 526/288, 526/243; 564/86
See application file for complete search history.

(56) References Cited

U.S. PATENT DOCUMENTS

| 2,803,615 | A | 8/1957 | Ahlbrecht et al. |
| 3,423,234 | A | 1/1969 | Heine |
| 3,442,664 | A | 5/1969 | Heine |
| 3,492,394 | A | 1/1970 | Heine |
| 3,787,351 | A | 1/1974 | Olson |
| 3,906,027 | A | 9/1975 | Muessdoerffer et al. |
| 3,919,295 | A | 11/1975 | Wechsberg et al. |
| 4,167,639 | A | 9/1979 | Billentstein et al. |
| 5,274,159 | A | 12/1993 | Pellerite et al. |
| 5,342,986 | A | 8/1994 | Pohmer et al. |
| 5,502,251 | A | 3/1996 | Pohmer et al. |
| 5,688,884 | A | 11/1997 | Baker et al. |
| 5,702,509 | A | 12/1997 | Pellerite et al. |
| 5,874,616 | A | 2/1999 | Howells et al. |
| 6,280,883 | B1 | 8/2001 | Lamanna et al. |
| 6,384,168 | B1 * | 5/2002 | Tanaka et al. ................ 526/245 |
| 6,452,038 | B1 * | 9/2002 | Rao et al. .................... 560/115 |
| 6,514,492 | B1 | 2/2003 | Gao et al. |
| 6,664,354 | B2 * | 12/2003 | Savu et al. ................... 526/243 |
| 2006/0149012 | A1 | 7/2006 | Terrazas et al. |
| 2007/0197401 | A1 | 8/2007 | Arco et al. |

FOREIGN PATENT DOCUMENTS

| EP | 1 225 187 | 7/2002 |
| EP | 1 225 188 | 7/2002 |
| EP | 1 329 548 | 7/2003 |
| EP | 1 369 1453 | 12/2003 |
| GB | 2 218 097 | 11/1989 |
| JP | 60126203 | * 7/1985 |
| WO | WO 01/30873 | 5/2001 |
| WO | WO 02/16306 | 2/2002 |
| WO | WO 03/089712 | 10/2003 |
| WO | WO 2004/013225 | 2/2004 |

OTHER PUBLICATIONS

E. Kissa, "Flourinated Surfactants", *Surfactants Science Series*, vol. 50, Marcel Dekker, NY (1994).
Dams et al., U.S. Appl. No. 11/027,410, "Compostions of Monomeric Surfactants": filed Dec. 30, 2004.
Dams et al., U.S. Appl. No. 11/027,404, "Compositions Containing C4-Swallow Tail Silanes", filed Dec. 30, 2004.

* cited by examiner

*Primary Examiner*—Karl J Puttlitz
*Assistant Examiner*—Chukwuma O Nwaonicha
(74) *Attorney, Agent, or Firm*—Kathleen B. Gross; Robert H. Jordan

(57) ABSTRACT

Described are polymeric surfactants which include a fluorinated moiety and a non-fluorinated moiety where the fluorinated moiety contains two perfluoro-lower-alkyl sulfonamido segments in proximity to each other ; the surfactants provide more efficient and effective lowering of the surface tension of liquids and increase of wetting of a coating on a substrate surface.

19 Claims, No Drawings

FLUOROCHEMICAL POLYMERIC SURFACTANTS

FIELD OF THE INVENTION

The invention relates to novel fluorosurfactants derived from short chain perfluoroalkylsulfonyl fluoride where the surfactant contains two short chain perfluoroalkylsulfonyl groups in close proximity to one another. The surfactants have been found to be more efficient and effective in lowering the surface tension of organic solvents and water, compared to environmentally sustainable single tail C4-based fluorosurfactants.

BACKGROUND OF THE INVENTION

Fluorosurfactants are known and described generally in "Fluorinated Surfactants" by E. Kissa, Surfactants Science Series, Vol. 50 (Marcel Dekker, New York 1994). Fluorosurfactants including those derived from C4 perfluoroalkyl groups are also described in U.S. Pat. Nos. 4,167,639, 3,906,027, 5,342,986 and 5,502,251. In particular, fluorochemical surfactants derived from nonafluorobutanesulfonyl fluoride (PBSF) have been described more recently in WO 01/30873 stating that the PBSF derived surfactants are almost as effective as the known premier surfactants derived from perfluorooctanesulfonyl fluoride (POSF). Furthermore, such surfactants have been described as more environmentally friendly. There remains a need to improve on the effectiveness and efficiency of such PBSF-derived fluorosurfactants.

SUMMARY OF THE INVENTION

We have found that polymeric fluorochemical surfactants having two short perfluoroalkyl segments per monomer unit, preferably those derived from perfluorobutanesulfonyl fluoride (PBSF), are very effective and efficient in lowering the surface tension of organic solvents and water.

The surfactants of the invention can be used as additives to paints, lacquers, inks, coating, fire fighting agents and the like. They may also provide superior leveling and wetting of floor finish coatings.

The surfactants of the invention as with the single PBSF segment surfactants are substantially free of fluorochemical compounds that eliminate slowly from living organisms and are therefore considered environmentally sustainable versus most competitive surfactants that contain longer perfluorinated segments.

Many previously known fluorochemical materials contain perfluorooctyl moieties. These surfactants ultimately degrade to perfluorooctyl-containing compounds. It has been reported that certain perfluorooctyl-containing compounds may tend to bio-accumulate in living organisms; this tendency has been cited as a potential concern regarding some fluorochemical compounds. For example, see U.S. Pat. No. 5,688,884 (Baker et al.). As a result, there is a desire for fluorine-containing compositions which are effective in providing desired surfactant properties, and which eliminate more effectively from the body (including the composition and its degradation products).

It is expected that the fluorochemical materials of the present invention, which contain perfluorobutyl moieties, when exposed to biologic, thermal, oxidative, hydrolytic, and photolytic conditions found in the environment, will break down to various degradation products. For example, compositions comprising perfluorobutylsulfonamido moieties are expected to degrade, at least to some extent, ultimately to perfluorobutylsulfonate salts. It has been surprisingly found that perfluorobutylsulfonate, tested in the form of its potassium salt, eliminates from the body much more effectively than perfluorohexylsulfonate and even more effectively than perfluorooctylsulfonate.

Accordingly, one aspect of the present invention provides a polymeric surfactant of the formula:

$$A\text{-}(M^f)_a\text{-}(M^h)_b\text{-}G \qquad \qquad I$$

wherein A is the residue of an initiator or hydrogen;
$M^f$ is a fluorinated monomer;
$M^h$ is a non-fluorinated monomer;
G is a monovalent organic residue comprising the residue of a chain transfer agent,
a represents units from 1 to 50; and b represents units from 1 to 50; which comprises the reaction product of
(a) units of a fluorinated monomer of the formula

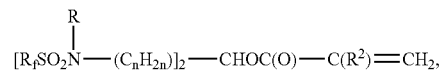

$$\qquad \qquad II$$

wherein $R_f$ is a $C_2$ to $C_5$ fluoroalkyl group;
R is alkyl or aryl;
$R^2$ is hydrogen or $CH_3$;
n is an integer of from 1 to 10; and
(b) units of a non-fluorinated monomer of the formula $$CH_2=C(R^2)C(O)X-(C_{n'}H_{2n'})Y \qquad \qquad III$$

wherein X is O, $N(R^1)$, or S;
$R^1$ is hydrogen or a $C_1$ to $C_4$ alkyl group;
$R^2$ is as defined above;
n' is an integer from 0 to 20; and
Y is a hydrogen when n'=0 or a hydrophilic group when n'>0, and
(c) G is the residue of a chain transfer agent, such as $-SCH_2CH_2OH$, $-SCH_2COOH$, or $-SCH_2CH(OH)CH_2OH$, and the like.

Another aspect of the present invention is a method of reducing the surface tension of a liquid by adding to said liquid a polymeric surfactant as defined above. Still another aspect of the invention is a method of increasing the wetting of a coating mixture on a substrate by adding to the coating mixture a polymeric surfactant as defined above.

One embodiment of the present invention is a method of reducing the surface tension of a liquid by adding to said liquid a surfactant derived from a polymeric compound having two perfluorobutanesulfonamide segments in close proximity to one another and the polymeric compound having a molecular weight of between about 2,000 to about 100,000 grams/mole, or between about 3,000 to about 50,000 grams/mole.

Another embodiment of the present invention is a method of increasing the wetting of a coating mixture on a substrate by adding to the coating mixture a surfactant derived from a polymeric compound having two perfluorobutanesulfonamide segments in close proximity to one another and the polymer compound having a molecular weight between about 2,000 to about 100,000 grams/mole, or preferably between about 3,000 to about 50,000 grams/mole.

Still another embodiment of the invention are the novel fluorinated acrylic monomers of formula II defined above.

A more detailed description of the present invention including particular embodiments is described hereinafter.

DETAILED DESCRIPTION OF THE PREFERRED EMBODIMENTS

The present invention provides a polymeric surfactant of the general formula:

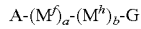   I wherein A is the residue of an initiator or hydrogen;
$M^f$ is a fluorinated monomer;
$M^h$ is a non-fluorinated monomer;
G is a monovalent organic residue comprising the residue of a chain transfer agent,
a represents units from 1 to 50; and b represents units from 1 to 50; which comprises the reaction product of
(a) units of a fluorinated monomer of the formula

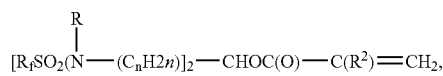   II wherein $R^f$ is a $C_2$ to $C_5$ fluoroalkyl group;
R is alkyl or aryl;
$R^2$ is hydrogen or $CH_3$;
n is an integer of from 1 to 10; and
(b) units of a non-fluorinated monomer of the formula

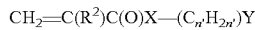   III wherein X is O, $N(R^1)H$ or S;
$R^1$ is hydrogen or a $C_1$ to $C_4$ alkyl group;
$R^2$ is as defined above;
n' is an integer from 0 to 20; and
Y is a hydrogen or a hydrophilic group, and
(c) G is the residue of a chain transfer agent.

The polymeric surfactants of the present invention are made from fluoromonomeric and non-fluoromonomeric units. The fluoromonomeric units contain two $C_2$ to $C_5$ perfluoroalkyl segments in close proximity to one another, a feature which is retained in the resulting polymer.

Fluoromonomeric units $M^f$ are of the formula

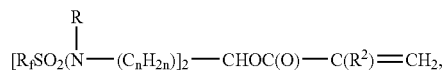   II wherein $R_f$ is a $C_2$ to $C_5$ fluoroalkyl group;
R is alkyl or aryl;
$R^2$ is hydrogen or $CH_3$; and
n is an integer of from 1 to 10;

Preferred fluoromonomeric units are those where $R^f$ is $C_4F_9$—. Other preferred units are those in which R is $CH_3$— or —$CH_2CH_3$. R may also be an aryl group such as phenyl which may be unsubstituted or substituted by up to five substituents including $C_1$ to $C_4$ alkyl, $C_1$ to $C_4$ alkoxy, halo, hydroxy, amino, nitro and the like. Preferred substituents include methyl, ethyl, fluoro, chloro, bromo or iodo.

The non-fluorinated monomer units $M^h$ are of the formula

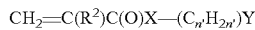   III wherein X is O, $N(R^1)$, or S;
$R^1$ is hydrogen or a $C_1$ to $C_4$ alkyl group;
$R^2$ is as defined above;
n' is an integer from 0 to 20; and
Y is a hydrogen or a hydrophilic group.

Hydrophilic groups Y form part of the non-fluoropolymer chain of the surfactant. As part of the non-fluorinated monomeric unit, they include without limitation groups such as —$SO_3M$, —$OSO_3M$, —COOM, —$N(R^1)_3Z$, —$N^+(R^1)_2O^-$, —$N(R^1)_2$—$(CH_2)_n$COOH, —$N(R^1)_2$—$(CH_2)_n$$SO_3H$, —$(EO)_p(PO)_q(EO)_p$—$R^1$, or —$(PO)_q(EO)_p(PO)_q$—$R^1$, wherein M is hydrogen, a metal ion, $NH_4^+$, or a protonated tertiary amine; $R^1$ is hydrogen or a $C_1$-$C_4$ alkyl group; EO is oxyethylene; PO is oxypropylene; p is an integer of 1 to about 128, q is an integer from 0 to about 54, Z is a counterion such as a halide (chloride, iodide, or bromide) or acetate, and n is an integer from 1 to 20.

The polymeric surfactants of the present invention contain non-fluorinated polymer and fluorinated polymer portions as described above. The reaction products include at least two perfluoro-$C_2$—$C_5$-alkyl segments in close proximity with one another with polyacrylates or methacrylates or poly(alkyleneoxy)moieties or copolymers thereof. The invention includes mixtures of the above described units of fluoromonomers and non-fluorinated monomers of an acrylate or methacrylate derivative and a corresponding polyalkyleneoxy acrylate or methacrylate copolymers.

The $C_2$ to $C_5$ perfluoroalkylsulfamido containing surfactants of the present invention are those in which a plurality of perfluoroalkylsulfon-amido segments are linked to for example, polyalkyleneoxy moieties through a polymeric chain. The polyalkyleneoxy moieties are particularly useful because they are soluble over a wide range of polarity and, by alteration of the carbon-oxygen ratio, can be tailored for any particular matrix. These copolymeric surfactants are non-ionic or ionic by inclusion of ionic segments. While normally liquid or low melting solids, the copolymeric surfactants can be in the form of gels in the absence of a solvent. They are soluble in polar solvents and synthetic resinous compositions and have about 5 to 30 weight %, preferably 10 to 25%, carbon-bonded fluorine based on the weight of the copolymer.

The polyalkyleneoxy moieties are at least one or more straight or branched alkyleneoxy groups having 2 to 6 carbon atoms, preferably 2 to 4 carbon atoms, most preferably 2 or 3 carbon atoms such as ethyleneoxy or propyleneoxy. When ethyleneoxy and propyleneoxy units are linked together, they form polyethyleneoxy or polypropyleneoxy blocks or a mixture of blocks. The oxypropylene units can be branched or linear.

Particularly preferred of these are those containing one polyoxypropylene and having at least one other block of polyoxyethylene attached to the polyoxypropylene block. Additional blocks of polyoxyethylene or polyoxypropylene can be present in a molecule. These materials having an average molecular weight in the range of about 500 to about 15,000 are commonly available as PLURONIC™ manufactured by the BASF Corporation and available under a variety of other trademarks from other chemical suppliers. In addition, polymers called PLURONIC™ R (reverse Pluronic structure) are also useful in the invention.

Particularly useful polyoxypropylene polyoxyethylene block polymers are those comprising a center block of polyoxypropylene units and blocks of polyoxyethylene units to each side of the center block. These copolymers have the formula shown below:

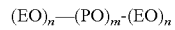

wherein m is an integer of about 21 to about 54 and n is an integer of about 7 to about 128. Additional useful block copolymers are block polymers having a center block of polyoxyethylene units and blocks of polyoxypropylene units to each side of the center block. The copolymers have the formula as shown below:

wherein m is an integer of about 14 to about 164 and n is an integer of about 9 to about 22.

Another preferred polyalkyleneoxy moiety useful in the co-polymers of the present invention containing two $C_2$ to $C_5$-perfluoroalkylsulfonamido segments in close proximity are those derived from polyethylene glycols having a molecular weight of about 200 to about 10,000. Suitable commercially available polyethylene glycols are available from Union Carbide under the trade name CARBOWAX™.

Another necessary part of the copolymeric surfactants of the present invention is acrylate and/or methacrylate moieties that form part of the starting monomers as well as the final polyacrylate products. $C_2$ to $C_5$-perfluoroalkylsulfonamido acrylate starting materials or monomers can be copolymerized with monomers containing polyalkyleneoxy moieties to form surface-active agents. Thus, the polyacrylate surfactants of the present invention can be prepared, for example, by free radical initiated copolymerization of a $C_2$ to $C_5$-perfluoroalkylsulfonamido radical-containing acrylate with a polyalkyleneoxyacrylate, e.g., monoacrylate or diacrylate or mixtures thereof. Adjusting the concentration and activity of the initiator, the concentration of monomers, the temperature, and the chain transfer agents can control the molecular weight of the polyacrylate copolymer. The description of the preparation of such polyacrylates is for example described in U.S. Pat. No. 3,787,351, which is incorporated herein by reference. The starting nonafluorobutanesulfonamido acrylates described above are also known in the art, e.g., U.S. Pat. No. 2,803,615, which is incorporated herein by reference.

The above free-radical polymerization may employ an initiator, when A is other than hydrogen. The term "free-radical initiator" designates any of the conventional compounds such as organic azo compounds, organic peroxides (e.g., diacyl peroxides, peroxyesters, dialkyl peroxides) and the like that provide initiation of radicals upon homolysis.

The polymeric surfactant also includes in the polymerization a chain transfer agent. The chain transfer agent is a functionalized; i.e. capable of reacting with the monomers of (a) and (b) to provide moieties in the polymeric chain. In one embodiment the chain transfer agent is a mercaptan chain transfer agent comprising one or more functional groups, including but not limited to hydroxy, amino, or carboxy groups. Examples include 2-mercaptoethanol, 3-mercapto-2-butanol, 3-mercapto-2-propanol, 3-mercapto-1-propanol, 3-mercapto-1-propionic acid, 2-mercapto- acetic acid, 3-mercapto-1,2-propanediol, 2-mercapto-ethylamine, di-(2-mercaptoethyl)sulfide, octylmercaptan and dodecylmercaptan.

The polyalkyleneoxy acrylates used in the above preparation can be prepared from commercially available hydroxypolyethers or polyoxyalkylene hydroxy compounds such as, for example, the PLURONIC™ or CARBOWAX™ polymers. Such hydroxy materials are reacted in a known manner with acrylic acid, methacrylic acid, acryloyl chloride or acrylic anhydride. Alternatively, a polyalkyleneoxy diacrylate, prepared in a known manner similar to the monoacrylates, can be copolymerized with the nonafluorobutanesulfonamido acrylate to obtain a polyacrylate copolymer of the present invention.

The above polymeric surfactant may also contain, if desired, a water-solubilizing polar group that may be anionic, nonionic, cationic or amphoteric. Preferred anionic groups include, but are not limited to, sulfonates (e.g., $-SO_3M$), sulfates (e.g., $-OSO_3M$), and carboxylates (e.g., $-C(=O)OM$) wherein. M is hydrogen, a metal cation such as an alkali or alkaline earth metal cation (e.g., sodium, potassium, calcium or magnesium, and the like), or a nitrogen-based cation, such as, for example, ammonium or a protonated tertiary amine (e.g., $(HOCH_2CH_2)_2N^{\oplus}HCH_3$).

Preferred cationic groups include, but are not limited to, quaternary amines, e.g., $-N^+(R^1)_3 2-$ wherein $R^1$ and 2 are as described above. Preferred amphoteric groups include, but are not limited to, zwitterionic species, e.g., $-N(R^1)_2(CH_2)_n COON$, $-N(R^1)_2(CH_2)_n$, $SO_3H$, wherein $R^1$ and n are as defined above.

The present invention in another general aspect includes a polymeric surfactant prepared from the reaction product of the following monomers or oligomers:

(a) a compound of the formula

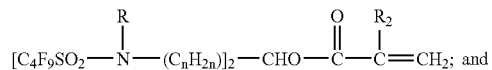

(b) a compound selected from the group consisting of

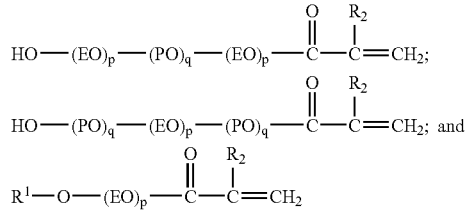

where R is alkyl or aryl; $R_1$ is hydrogen or alkyl of 1 to 4 carbon atoms; $R_2$ is hydrogen or $CH_3$; n is an integer from 1 to 10; p is an integer of 1 to about 128 and q is an integer of 0 to about 55.

To enhance compatibility with various components found in many adhesive and binder systems, it may be desired to include long chain alkyl compounds in the surfactant. For example, the surfactant may be made incorporating compounds of the formula $R_h-O-C(=O)C(R_2)=CH_2$ wherein $R_h$ is an alkyl of 12 to 20 carbon atoms.

In one particular aspect of the surfactant, the polyalkyleneoxy group, is of the formulae A or B:

or

wherein p is an integer of 1 to about 128 and q is an integer of 0 to about 54.

Alternatively, another embodiment is a copolymer surfactant where the polyalkyleneoxy moiety is derived from a polyalkylene oxide of formula A where q is an integer of about 9 to about 22 and p is an integer of about 14 to about 128. Preferred is a copolymeric surfactant where the oxyethylene moieties are on the outside of the block copolymer with propylene oxide and p is an integer of about 7 to about 128 and q is an integer of about 21 to about 54. Another preferred embodiment is the copolymeric surfactant containing the moiety of formula A where p is about 11 and q is about 21.

In one embodiment of the invention the surfactant is a mixture or reaction product comprising a compound of Formula II and a compound of Formula IIIa

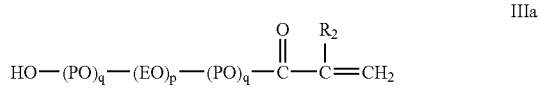

IIIa wherein $R^2$ is hydrogen or methyl.

In one preferred embodiment, R is —CH$_3$ or —CH$_2$CH$_3$; $R^2$ is CH$_3$, q is 0 and p is from about 4 to about 10. Another preferred embodiment is the surfactant where q is from about 9 to about 22 and p is about 14 to about 128.

Methods of Use

The surfactants of the present invention have similar beneficial properties and can be used for the same purposes as the single group perfluorobutanesulfonamido surfactant and the premier surfactants, such as a corresponding perfluorooctanesulfonamido surfactant. The surfactants of the present invention are surprisingly efficient and effective in lowering the surface tension of organic solvents and water. Similarly, the surfactants of the present invention can improve the wetting of a liquid or coating mixture on a substrate to an extent comparable to the other fluorosurfactants.

The surfactants of this invention can be used individually or in combination to produce the desired surface tension reduction or wetting improvement.

Fluorochemical surfactants of the present invention have been found to be surprisingly effective in a number of applications. For example the fluorochemical surfactants are used as coating additives to provide better wetting of the coating to a substrate surface, or better wetting of a component within the coating formulation, for example, enhancing the wetting characteristics of a thickening agent. When use in water borne coatings, the fluorochemical surfactants are formulated into an aqueous solution or dispersion at a final concentration of about 0.001 to about 0.1 weight percent based on the weight of the solution or dispersion. The formulated product can be used in many coating applications such as floor polishes and finishes, varnish for a variety substrates, including wood floors, water borne gel applied in the manufacture of photographic film, automotive topcoats, and marine coatings. The fluorochemical surfactants can be used in other protective thin layer coatings as well, by preparing a formulation containing a surfactant, a powder, or a liquid mixture with organic solvents, fillers, and resins, including but not limited to epoxies, urethanes, acrylics, and the like. Typically, the surfactant concentration is about 0.1 to about 0.5 weight percent based on the weight of the formulation. Specific uses for these protective coatings include, for example, corrosion resistance coatings on electronic components for the computer and telecommunications industry, signage, office brushing, spraying, flow coating, and the like. The coatings are typically applied, dried, and cured, leaving the finished product with a solid coating. As an example, the surfactants have been found to be extremely effective in providing smooth clear polyurethane coatings without coating defects on surfaces that are difficult to wet, such as oily surfaces.

In still other applications, the fluorochemical surfactants of the present invention can be used as wetting agents or additives in photoresists, developers, and cleaning solutions in the manufacture of electronic materials. When used in photoresists, the surfactants provide a dramatic decrease in defect densities. The surfactant is mixed in a solvent solution to a final concentration of about 0.01 to about 0.1 weight percent based on the weight of the solution, and the mixture is coated onto electronic parts, typically by spin coating. For example, the mixture is dropped onto a wafer while it is spinning, forming an even coating on the wafer. In subsequent processing, a portion of the coating on the wafer is stripped with alkaline cleaners, etched with strongly oxidizing gases, or removed with solvents such as acetone. The remaining coating is cured on the article. When used in developer and cleaning solutions, the fluorochemical surfactant enables removal of contaminants from microchannels, which affects resolution and is critical to device operation. The surfactants provide low surface energy and chemical/thermal stability, allowing smaller critical dimensions (increased resolution) in the product as well as improved processor speeds and manufacturability. The fluorochemical surfactant is mixed in an aqueous solution to a final concentration of about 0.005 to about 0.5 weight percent based on the weight of the developer or cleaning solution. The mixture is transferred to a bath, and the electronic parts are either dipped or run through the bath on a conveyor belt.

In a further application, the fluorochemical surfactants of the present invention are useful in hard surface cleaning solutions to provide improved wetting of the hard surface and the contaminants to be removed. A cleaning solution is formulated to include about 0.005 to about 0.5 weight percent surfactant based on the weight of the cleaning solution. The cleaning solution is placed in a dispensing container such as a spray bottle or refill container for the spray bottle. Upon use, the cleaning solution is sprayed or otherwise applied to a hard surface such as window glass, a mirror, or ceramic tile, and the surface is wiped clean with a paper or fabric wipe.

In yet another application, the fluorochemical surfactants of the present invention are useful to enhance the wetting characteristics of thickening agents to form gels for solidifying or encapsulating medical waste. The surfactant is mixed with ethanol and applied to partially neutralized polyacrylic acid resin, typically having an average particle size of about 500-800 microns. Other ingredients may be added to eliminate biological hazards and transform biological waste into non-hazardous waste. The ethanol is evaporated and the treated resin (about 0.5 to about 1.5 percent by weight surfactant based on the weight of the resin) in powder form is packaged and ready for use. The resulting product may be used in a variety of ways, including absorption of biological fluids generated, for example, in an operating room, and encapsulation of sharps generated in a host of medical procedures. The powder can be added to biological fluids that wet the resin particles, causing gelation to occur. The sharps can be placed in a container, for example, containing the powder, and when water is added the powder gels around the sharps. In both instances, the container is disposed of as a solid non-hazardous waste.

The fluorochemical surfactants of the present invention may be used as leveling additives for various resist inks for electronics and semiconductors, for inks such as gravure coat, screen print and thermal print, for adhesive layer for Wafer polishing and Wafer CMP solutions, for hard coats for plastic lenses, and for lubricant spray coatings. The surfactants may be used as leveling or wetting additives for films such as film condenser, microfilm, medical X-ray film, and APS film. The surfactants of the invention may also be used as wetting and lubricant additives for methon, urethane, epoxy, acrylic, polyimide, and other materials, as foam blowing additives, as finishing additives for dry cleaning, as a leveling additive for pen ink, as thickening/oil barrier additives for grease coatings and grease/PTFE lubricants, and as leveling or wetting additives for green house film.

'The above applications are not meant to be limiting but only exemplary. The following section provides working examples that describe in particular and by way of illustration the present invention. These working examples are provided as illustrative and are not to be deemed to be limiting on the invention.

EXAMPLES

Glossary

| Designator | Name, Structure and/or Formula | Availability |
|---|---|---|
| AIBN | $(CH_3)_2C(CN)N=NC(CH_3)_2CN$ | Sigma-Aldrich, Milwaukee, WI |
| Acryloyl chloride | $ClC(O)CH=CH_2$ | Sigma-Aldrich |
| BuEAc | 2-butoxyethyl acetate $CH_3CO_2CH_2CH_2O(CH_2)_3CH_3$ | Sigma Aldrich |
| $C_4F_9SO_2N(CH_3)H$ | | May be made as described in U.S. Pat. No. 6,664,354 (Savu et. al) Example 1, Part A. |
| CW750-A | "CARBOWAX 750" acrylate | May be made as described in U.S. Pat. No. 3,728,151, Example 17 |
| 1,3-dichloro-2-propanol | $ClCH_2CH(OH)CH_2Cl$ | Sigma-Aldrich |
| DMF | N,N-Dimethylformamide $HC(O)NMe2$ | Sigma-Aldrich |
| DPM | "DOWANOL DPM"; dipropyleneglycol methylether | Sigma-Aldrich |
| MEHQ | Hydroquinone monomethyl ether | Sigma-Aldrich |
| MEK | Methylehtyl ketone; $CH_3C(O)C_2H_5$ | Sigma-Aldrich |
| 3-mercapto-1,2,-propanediol | $HSCH_2CH(OH)CH_2OH$ | Sigma-Aldrich |
| Phenothiazine | (structure) | Sigma-Aldrich |
| "PLURONIC 44A" | | BASF Corp., Florham Park, NJ |
| TEGME | triethylene glycol methyl ether | Sigma-Aldrich |

Test Methods

Surface Tension Measurement

Surface Tension was measured using a Kruss K10ST tensiometer (mN/m; @ 25° C.), available from Kruss GmbH, Hamburg Germany.

Preparation of $[C_4F_9SO_2N(CH_3)CH_2]_2CHOH$

A three necked round bottom 1000 mL flask, fitted with a stirrer, heating mantle, condenser, nitrogen inlet, Dean-Stark trap and thermometer was charged with $C_4F_9SO_2N(CH_3)H$ (313.0 g; 1 mole), dimethylformamide (100.0 g) and heptane (40.0 g). The mixture was heated at reflux and dried by azeotropic distillation. The mixture was cooled to about 30° C. under nitrogen purge, and $NaOCH_3$ (30% in methanol; 180.0 g 1 mole) was added. The mixture was heated at 50° C. for one hour, stripping off methanol under vacuum from an aspirator. 1,3-dichloro-2-propanol (65.0 g; 0.5 mole) was added to the flask and the temperature was elevated to 80° C. and held overnight. The ensuing mixture was washed with DI water (300 mL at 80° C.) three times and the remaining organic layer was separated and dried in an oven at 120° C. for 1 hour. Analysis of the resulting yellow brown solid was consistent with $[C_4F_9SO_2N(CH_3)CH_2]_2CHOH$ and $C_4F_9SO_2N(CH_3)CH_2CH(OH)CH_2Cl$ as major components.

Vacuum distillation at 150 to 180° C. (at 0.1 mm Hg) yielded $[C_4F_9SO_2N(CH_3)CH_2]_2CHOH$ (250.0 g).

Preparation of FC-1; $[C_4F_9SO_2N(CH_3)CH_2]_2CHOC(O)CH=CH_2$

A three-necked round bottom 500 mL flask, fitted with a condenser, stirrer, nitrogen inlet, cooler and thermometer was charged with $[C_4F_9SO_2N(CH_3)CH_2]_2CHOH$ (204.6 g; 0.30 mole) and MEK (250.0 g) under a nitrogen purge. The flask was heated and approximately 50 mL of MEK was distilled from the solution. The ensuing solution was cooled to 5° C. using an ice bath and triethylamine (30.3 g; 0.30 mole) was added. Acryloyl chloride (27.3 g; 0.30 mole) was added dropwise over about one hour, followed by MEHQ and phenothiazine. The temperature of the flask was held below 40° C. during these additions. The temperature of the mixture was elevated to 50° C. for one hour, then cooled to about 30° C., and washed with DI water (3×150 mL aliquots). Analysis of the resulting amber solution was consistent with the structure:

$[C_4F_9SO_2N(CH_3)CH_2]_2CHOC(O)CH{=}CH_2$.

Example 1

Preparation of FC-1/Pluronic 44A; 30/70

A three-necked round bottom 500 mL flask, fitted with a condenser, stirrer, nitrogen inlet, cooler and thermometer was charged $[C_4F_9SO_2N(CH_3)CH_2]_2CHOC(O)CH{=}CH_2$ (30.0 g), "PLURONIC 44A" (70.0 g), 3-mercapto-1,2,-propanediol (5.0 g), toluene (100.0 g) and "AIBN" (0.5 g). The ensuing mixture was degassed three times using vacuum/nitrogen cycles and heated to 70° C. under a nitrogen purge for 6 hours. Additional "AIBN" (0.10 g) was added and the flask was kept at 70° C. overnight. The next day toluene was removed, using a rotary evaporator, yielding a viscous liquid.

Example 2

Preparation of FC-1/CW750A/AA; 55/35/10.

A three-necked round bottom 500 mL flask, fitted with a condenser, stirrer, nitrogen inlet, cooler and thermometer was charged $[C_4F_9SO_2N(CH_3)CH_2]_2CHOC(O)CH{=}CH_2$ (55.0 g), "CW750A" (35.0 g), acrylic acid (10.0 g), 3-mercapto-propanediol (3.0 g), ethyl acetate (100.0 g) and "AIBN" (0.75 g). The ensuing mixture was degassed three times using vacuum/nitrogen cycles and heated to 70° C. under a nitrogen purge for 6 hours. Additional "AIBN" (0.10 g) was added and the flask was kept at 70° C. overnight. The next day a clear solution resulted.

TABLE 1

Surface Tension values

| Example | Solvent | Concentration of Surfactant (% wt) | Surface Tension (mN/m) |
|---|---|---|---|
| Ex 1 | DPM | 0.5 | 25.4 |
| Ex 1 | Water | 0.1 | 21.5 |
| Ex 1 | Water | 0.01 | 22.8 |
| C-1 | DPM | — | 28.2 |
| Ex 2 | TEGME | 0.5 | 19.6 |
| C-2 | TEGME | — | 36.0 |
| C-3 | Toluene | — | 27.5 |
| Ex 2 | Toluene | 0.5 | 21.6 |
| C-4 | BuEAc | — | 26.1 |
| Ex 2 | BuEAc | 0.5 | 22.1 |
| C-5 Ex 1 U.S. Pat. No. 5,342,986 | Water | 0.1 | 28.4 |
| C-6 Ex 13 U.S. Pat. No. 4,167,639 | Water | 0.1 | 27.6 |

The above specification, examples and data provide a complete description of the manufacture and use of the composition of the invention. Since many embodiments of the invention can be made without departing from the spirit and scope of the invention, the invention resides in the claims hereinafter appended.

We claim:

1. A polymeric surfactant of the formula:

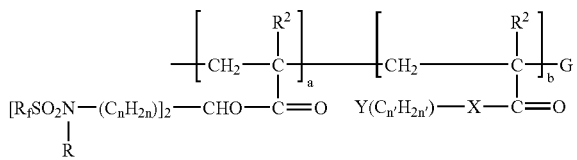

wherein a represents a value from 1 to 50 and b represents a value from 1 to 50, and wherein said surfactant is the reaction product of (a) a fluorinated monomer of the formula

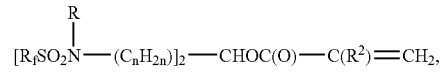

wherein $R_f$ is a $C_2$—$C_5$ fluoroalkyl group; R is alkyl or aryl; $R^2$ is hydrogen or $CH_3$; and n is an integer of from 1 to 10;

(b) a non-fluorinated monomer of the formula $CH_2{=}C(R^2)C(O)X{-}(C_{n'}H_{2n'})Y$ wherein X is O, N($R^1$) or S; $R^1$ is hydrogen or a $C_1$ to $C_4$ alkyl group; $R^2$ is as defined above; n' is an integer from 0 to 20; and Y is a hydrogen when n' =0 or a hydrophilic group when n' >0, wherein the hydrophilic group is independently —$SO_3M$, —$OSO_3M$, —COOM, —N($R^1$)$_3$Z, —N($R^1$)$_2$O, —N($R^1$)$_2$—($CH_2$)$_{n''}$COOH, —N($R^1$)$_2$—($CH_2$)$_{n''}$$SO_3$H, —(EO)$_p$(PO)$_q$(EO)$_p$-$R^1$, or —(PO)$_q$(EO)$_p$(PO)$_q$-$R^1$, wherein M is hydrogen, a metal ion, $NH_4^+$, or a protonated tertiary amine; $R^1$ is hydrogen or a $C_1$ to $C_4$ alkyl group; EO is oxyethylene; PO is oxypropylene; Z is a halide or acetate; p is from 1 to 128, q is from 0 to 54; and n'' is an integer from 1 to 20; and (c) a chain transfer agent, wherein G is —S-$R^3$, and wherein $R^3$ is alkyl having up to 12 carbon atoms and optionally substituted by one or more hydroxy, amino, or carboxy groups.

2. A surfactant according to claim 1, wherein said surfactant is the reaction product of (a), (b), (c), and (d) wherein (d) is a monomer of the formula

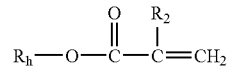

in which $R_h$, is an alkyl of 12 to 20 carbon atoms.

3. A surfactant according to claim 1, wherein $R_f$ is a $C_4$ fluoroalkyl group.

4. A surfactant according to claim 1, wherein the chain transfer agent is 2-mercaptoethanol, 3-mercapto-1,2-propanediol, or mercaptoacetic acid.

5. A surfactant according to claim 1, wherein R is —$CH_3$ or $CH_2CH_3$ and $R^1$ is hydrogen or methyl.

6. A surfactant according to claim 1, wherein (b) is a non-fluorinated monomer of the formula

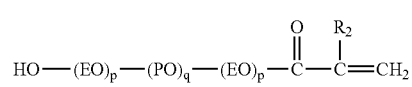

wherein $R^2$ is hydrogen or methyl, p is from 1 to 128, and q is from 0 to 54.

7. A surfactant according to claim 6, wherein p is an integer of 7 to 128 and q is an integer of 21 to 54.

8. A surfactant according to claim 6, wherein p is about 11 and q is about 21 and R is —$CH_3$ or —$CH_2CH_3$.

9. A surfactant according to claim 1, wherein (b) is a non-fluorinated monomer of the formula

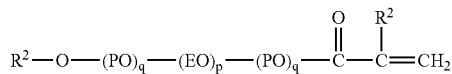

wherein $R^2$ is hydrogen or methyl, q is from 0 to 54, and p is from 1 to 128.

10. A surfactant according to claim 9, wherein R is —$CH_3$ or —$CH_2CH_3$; $R^2$ is H or $CH_3$; q is 0; and p is from about 4 to about 10.

11. A surfactant according to claim 9, wherein R is —$CH_3$ or —$CH_2CH_3$; $R^2$ is H or $CH_3$; q is from about 9 to about 22; and p is from about 14 to about 128.

12. A surfactant according to claim 1, wherein in the non-fluorinated monomer, X is O, n' is 0, and Y is H.

13. A polymeric surfactant represented by formula:

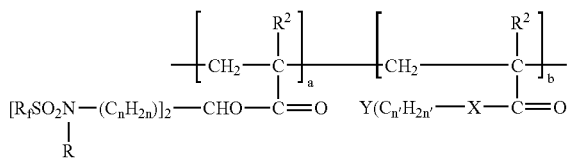

wherein
$R_f$ is a $C_2$-$C_5$ fluoroalkyl group;
R is alkyl or aryl;
$R^2$ is hydrogen or $CH_3$;
n is an integer of from 1 to 10;
X is O, N($R^1$) or S;
$R^1$ is hydrogen or a $C_1$ to $C_4$ alkyl group;
n' is an integer from 0 to 20;
Y is a hydrogen when n'=0 or a hydrophilic group when n'>0, wherein the hydrophilic group is independently —$SO_3M$, —$OSO_3M$, —COOM, —N($R^1$)$_3$Z, —N($R^1$)$_2$O, —N($R^1$)$_2$—($CH_2$)$_{n''}$COOH, —N($R^1$)$_2$—($CH_2$)$_{n''}$$SO_3H$, —(EO)$_p$(PO)$_q$(EO)$_p$-$R^1$ or —(PO)$_q$(EO)$_p$(PO)$_q$-$R^1$, wherein M is hydrogen, a metal ion, $NH_4^+$, or a protonated tertiary amine; $R^1$ is hydrogen or a $C_1$ to $C_4$ alkyl group; EO is oxyethylene; PO is oxypropylene; Z is a halide or acetate; p is from 1 to 128, q is from 0 to 54; and n" is an integer from 1 to 20;
a represents a value from 1 to 50; and
b represents a value from 1 to 50.

14. A method of reducing the surface tension of a liquid comprising adding to said liquid a polymeric surfactant according to claim 13 having a molecular weight of between 2,000 to 100,000 grams/mole.

15. The method of claim 13, wherein the molecular weight of the polymeric surfactant is between 4,000 and 30,000 grams/mole.

16. A method of reducing the surface tension of a liquid comprising adding to said liquid a polymeric surfactant according to claim 1.

17. A method of reducing the surface tension of a liquid comprising adding to said liquid a polymeric surfactant according to claim 2.

18. A method of increasing the wetting of a coating on a substrate surface comprising adding to a coating mixture a polymeric surfactant according to claim 1.

19. A method of increasing the wetting of a coating on a substrate surface comprising adding to a coating mixture a polymeric surfactant according to claim 13.

* * * * *

UNITED STATES PATENT AND TRADEMARK OFFICE
CERTIFICATE OF CORRECTION

Page 1 of 1

PATENT NO.      : 7,776,983 B2
APPLICATION NO. : 11/026706
DATED           : August 17, 2010
INVENTOR(S)     : Michael S Terrazas It is certified that error appears in the above-identified patent and that said Letters Patent is hereby corrected as shown below:

Column 12
Line 28, in Claim 1, delete "n"is" and insert in place thereof -- n" is --.

Line 35, in Claim 2, delete "of(a)," and insert in place thereof -- of (a), --.

Column 14
Line 19, in Claim 15, delete "claim 13," and insert in place thereof -- claim 14, --.

Signed and Sealed this
Ninth Day of August, 2011

David J. Kappos
*Director of the United States Patent and Trademark Office*